United States Patent
Parker et al.

(10) Patent No.: US 9,291,195 B1
(45) Date of Patent: Mar. 22, 2016

(54) BALL JOINT ASSEMBLY

(71) Applicant: Federal-Mogul Motorparts Corporation, Southfield, MI (US)

(72) Inventors: Glen C. Parker, Saint Peters, MO (US); Peter J. Rauch, Saint Peters, MO (US)

(73) Assignee: Federal-Mogul Motorparts Corporation, Southfield, MI (US)

( * ) Notice: Subject to any disclaimer, the term of this patent is extended or adjusted under 35 U.S.C. 154(b) by 0 days.

(21) Appl. No.: 14/559,233

(22) Filed: Dec. 3, 2014

(51) Int. Cl.
*F16C 11/06* (2006.01)

(52) U.S. Cl.
CPC ......... *F16C 11/0628* (2013.01); *F16C 11/0685* (2013.01)

(58) Field of Classification Search
CPC .................................. Y10T 403/32361; Y10T 403/32647–403/32663; Y10T 403/32704–403/32729; F16C 11/06; F16C 11/0619; F16C 11/0638; F16C 11/086; F16C 11/0642; F16C 11/0647
See application file for complete search history.

(56) References Cited

U.S. PATENT DOCUMENTS

| | | | |
|---|---|---|---|
| 3,305,617 A | 2/1967 | Dumpis | |
| 4,017,197 A * | 4/1977 | Farrant | B60G 7/005 403/132 |
| 4,063,834 A | 12/1977 | Hanson et al. | |
| 5,655,848 A | 8/1997 | Catron | |
| 5,772,337 A * | 6/1998 | Maughan | F16C 11/0638 384/206 |
| 5,904,436 A * | 5/1999 | Maughan | F16C 11/0628 29/441.1 |
| 6,082,923 A | 7/2000 | Maughan | |
| 6,171,012 B1 * | 1/2001 | Westphal | F16C 11/0628 403/132 |
| 6,561,716 B1 | 5/2003 | Suzuki et al. | |
| 7,367,742 B2 | 5/2008 | Brunneke et al. | |
| 8,047,739 B2 * | 11/2011 | Sellers | F16C 11/069 403/122 |
| 8,678,656 B2 * | 3/2014 | Richter | F16C 11/0638 384/213 |
| 8,734,044 B2 * | 5/2014 | Schaumann | F16C 11/0638 403/132 |
| 8,764,336 B2 * | 7/2014 | Kraatz | F16C 11/0695 403/137 |
| 2014/0086667 A1 | 3/2014 | Elterman et al. | |

* cited by examiner

*Primary Examiner* — Daniel Wiley
(74) *Attorney, Agent, or Firm* — Robert L. Stearns; Dickinsin Wright, PLLC

(57) ABSTRACT

The ball joint assembly includes a housing with an open interior and which extends from a closed end to an open end. A stud ball with a ball portion is disposed in the open interior of the housing. A first bearing is also disposed in the open interior and includes first and second contact surfaces which are spaced from one another by a gap. The contact surfaces are in sliding contact with the ball portion of the ball stud, and the first contact surface is semi-spherically curved with a generally constant diameter while the second contact surface is generally cylindrical in shape. A second bearing is disposed in the open interior of the housing and has a third contact surface which is in sliding contact with the ball portion of the stud ball and is biased against the ball portion.

13 Claims, 2 Drawing Sheets

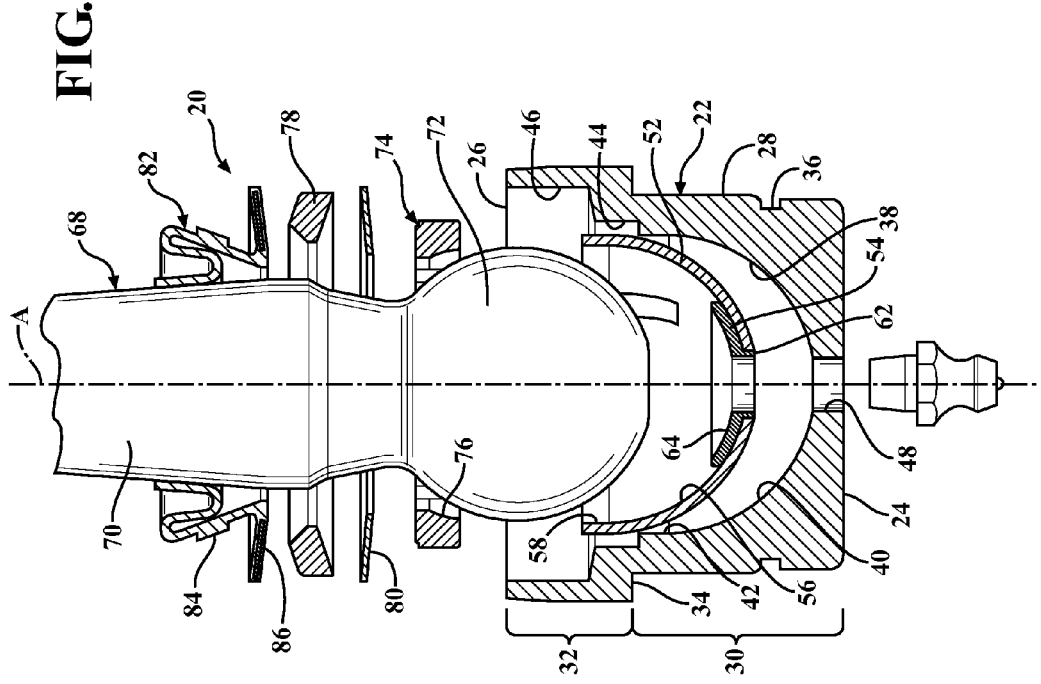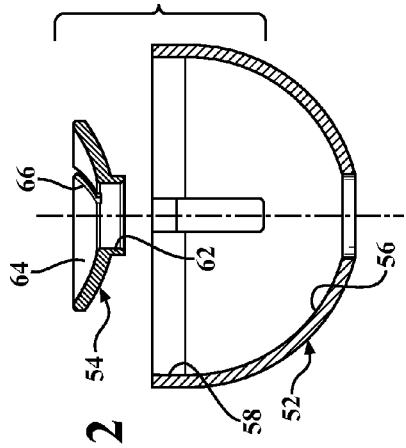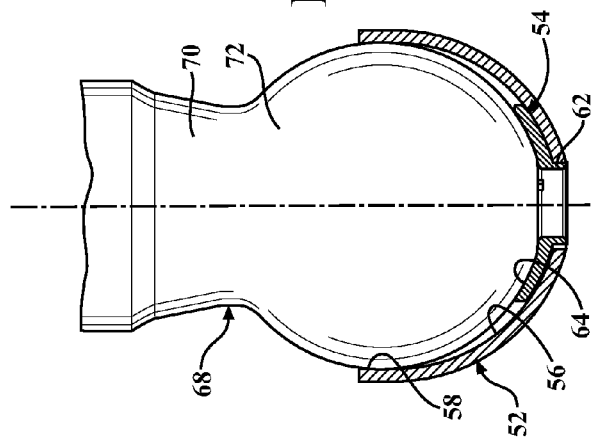

BALL JOINT ASSEMBLY

BACKGROUND OF THE INVENTION

1. Field of the Invention

The present invention is related, generally, to ball joint assemblies and, more particularly, to ball joint assemblies of the type used in automotive steering and suspension systems.

2. Related Art

Vehicle steering and suspension systems typically include one or more ball joints, such as tie rod end ball-type joints for operable attachment of a tie rod end to a steering knuckle. One typical type of ball joint is a compression loaded ball joint which includes a ball stud with a generally spherical ball portion which is captured by one or more bearings that are contained within a housing.

During use, the spherical ball portion of the ball stud is subjected to both varying axial loads and varying radial loads. The axial forces are applied in a downward direction and compress the lower bearing while the radial forces cycle in various directions. Additionally, the ball stud may be subjected to rotational forces about its axis which cause the ball stud to rotate relative to the bearings and the housing. The application of these rotational forces are applied while the ball stud is under axial and/or radial loads results in wear between the spherical ball portion of the ball stud and the bearings (which are usually of plastic or metal) that capture the ball portion.

Typically, the contact angle and the clearance between the outer surface of the spherical ball portion of the ball stud and the contact surfaces of the bearings affects the resulting rotational torque required to rotate the ball stud. It is preferred to provide the ball joint with minimal clearance to limit movement of the ball portion relative to the bearing in both the axial and radial directions while also minimizing the rotational torque. In order to minimize the clearance between the ball portion of the ball stud and the bearings, some ball joint manufacturers provide the curved contact surfaces of the bearings with a very similar diameter to the diameter of the ball portion. However, wear in the ball portion and in the bearings may cause the contact angles and the clearances to change over time, thereby increasing the rotational torque values.

Another approach that ball joint manufacturers have taken with the goal of limiting the change in rotational torque values as the ball portion and the bearings wear from use is to provide the curved contact surfaces of the bearings with a greater diameter than the diameter of the ball portion. This approach has the effect of minimizing the contact areas and angles between the ball portion and the contact surfaces of the bearings, thereby limiting the increase in rotational torque values as the bearings and ball portion wear. However, this approach also results in increased clearance between the ball portion and the bearings, which may reduce the expected life of the ball joint.

SUMMARY OF THE INVENTION

One aspect of the present invention provides for an improved ball joint assembly which exhibits both improved operating life and also improved rotational torque during as the components therein wear. The ball joint assembly includes a housing with an open interior and which extends from a first end that is at least substantially closed to a second end that is open. A stud ball including a shank portion and a ball portion is at least partially disposed in the open interior of the housing. A first bearing is also disposed in the open interior of the housing and includes a first contact surface and a second contact surface which is spaced from the first contact surface by a gap. The first and second contact surfaces are in sliding contact with the ball portion of the ball stud, and the first contact surface is semi-spherically curved with a generally constant diameter. The second contact surface is generally cylindrical in shape. A second bearing, which is formed as a separate piece from the first bearing, is at least partially disposed in the open interior of the housing. The second bearing has a third contact surface which is in sliding contact with the ball portion of the stud ball and is biased against the ball portion.

According to another aspect of the present invention, the first bearing includes a lower bearing and a bearing sleeve. The first contact surface is on the lower bearing, and the second contact surface is on the bearing sleeve. The lower bearing and the bearing sleeve may either be formed separately and subsequently joined together or they may be formed integrally with one another.

Another aspect of the present invention provides for a method of making a ball joint assembly. The method includes the step of preparing a housing that extends from a closed first end to an open second end and has an open interior. The method proceeds with the step of inserting a first bearing into the open interior of the housing. The first bearing has a first contact surface and a second contact surface which is spaced from the first contact surface by a gap. The first contact surface is semi-spherically curved in shape, and the second contact surface is cylindrical in shape. The method proceeds with the step of inserting a stud ball, which includes a shank portion and a ball portion, into the open interior of the housing such that the ball portion is in sliding contact with the first and second contact surfaces. The method continues with the step of inserting a second bearing in the open interior of the housing. The second bearing is formed as a separate piece from the first bearing and has a third contact surface which is in sliding contact with the ball portion of the stud ball. The second bearing has a third contact surface which is in sliding contact with the ball portion of the stud ball. The method proceeds with the step of biasing the second bearing against the ball portion of the stud ball.

According to another aspect of the present invention, the method may additionally include the steps of inserting a cover plate into the open interior to close the open end of the housing and deforming the cover plate after it has been inserted into the open interior.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 an exploded and cross-sectional view of a first exemplary embodiment of a ball joint assembly in a pre-assembled state;

FIG. 2 is an exploded and cross-sectional view of a first bearing of the ball joint assembly of FIG. 1;

FIG. 3 is a cross-sectional view of the first bearing of the ball joint assembly of FIG. 1;

DESCRIPTION OF THE ENABLING EMBODIMENT

Figure 4:
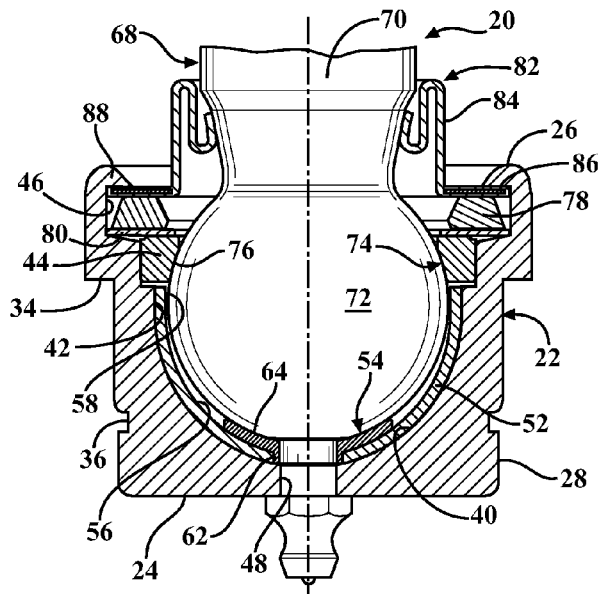
FIG. 4 is a cross-sectional view of the ball joint assembly of FIG. 1 in an assembled state.

Referring to the Figures, wherein like numerals indicate corresponding parts throughout the several views, a first exemplary embodiment of an improved socket or ball joint assembly 20 is generally shown in FIG. 1. The ball joint assembly 20 could find uses in, for example, a suspension system, or a steering mechanism of a vehicle or any suitable automotive or non-automotive application.

As shown, the exemplary ball joint assembly 20 includes a housing 22 which is made of metal and extends along an axis from a first end that is at least substantially closed (hereinafter referred to as the "closed end 24") to a second end that is open (hereinafter referred to as the "open end 26"). The housing 22 presents an exterior wall 28 which extends from a first section 30 adjacent the closed end 24 to a larger second section 32 adjacent the open end 26. Specifically, each of the first and second sections 30, 32 is generally circular in shape when viewed in cross-section, and the second section 32 has a larger diameter than the first section 30. The exterior wall 28 also presents a ledge 34 which faces towards the closed end 24 of the housing 22 and which separates the first and second sections 30, 32. In use, the ledge 34 defines a stopping point for inserting the housing 22 into an opening of another part (such as a component of a vehicle suspension system). The exterior wall 28 further presents a ring groove 36 which is spaced axially from the ledge 34 for receiving a retainer ring (not shown) to lock the housing 22 into engaging with the other part.

Referring still to FIG. 1, the housing 22 further presents an interior wall 38 which surrounds an open interior. Starting from the closed end 24 of the housing 22, the interior wall 38 is divided serially into a semi-spherical 40 section, a cylindrical section 42, an exit bearing section 44 and a cover plate section 46. The cover plate section 46 has the largest diameter, and the exit bearing section 44 has a larger diameter than the cylindrical section 42. The interior wall 38 is tapered or angled between the exit bearing section 44 and the larger cover plate section 46. The closed end 24 of the housing 22 further includes a lubricant opening 48 and a grease fitting 50 is received within the lubricant opening 48 for selectively conveying a lubricant (not shown), such as grease, into the open interior of the housing 22 to lubricate the components in the open interior.

In the exemplary embodiment, a first bearing, which is made of two pieces, is disposed within the open interior of the housing 22. The two-piece first bearing includes a bearing sleeve 52 and a lower bearing 54. The bearing sleeve 52 is generally cup-shaped and is nested within the open interior of the housing 22 with a portion of the bearing sleeve 52 being positioned within the semi-spherical 40 section and a portion of the bearing sleeve 52 being positioned within the cylindrical section 42 of the interior wall 38. Specifically, the bearing sleeve 52 has a curved portion 56 which abuts the curved section of the inner wall and a cylindrical portion 58 which abuts the cylindrical section 42 of the interior wall 38. The lower end of the bearing sleeve 52 has an opening 60 which is aligned with the lubricant opening 48 of the housing 22.

Referring to FIG. 3, the lower bearing 54 is received within the bearing sleeve 52 and includes an extension 62 which extends into the opening 60 of the bearing sleeve 52 holding the lower bearing 54 in a predetermined position within the bearing sleeve 52. The lower bearing 54 is preferably made of a lower powder metal or of steel and has an upper contact surface 64 which faces towards the open end 26 of the housing 22. The upper contact surface 64 is curved semi-spherically with a fixed diameter and has a plurality of lubricant grooves 66 (shown in FIG. 2) formed therein for distributing the lubricant from the lubricant opening 48 along the upper contact surface 64. As shown, the upper contact surface 64 is raised above the bottom of the bearing sleeve 52.

Referring back to FIG. 1, the ball joint assembly 20 further includes a ball stud 68 with a shank portion 70 and a ball portion 72. The ball portion 72 is received within the cup-shaped bearing sleeve 52, and the shank portion 70 of the ball portion 72 projects out of the open interior through the open end 26 of the housing 22 for attachment with another component, e.g., a steering knuckle. The ball stud 68 is preferably made of a metal, such as steel.

The ball portion 72 is generally semi-spherical 40 in shape and is in sliding contact with the upper contact surface 64 of the lower bearing 54 with the cylindrical portion 58 of the bearing sleeve 52. Specifically, the ball portion 72 is also positioned such that an equator of the ball portion 72 is aligned with and slidably contacts the cylindrical portion 58 of the bearing sleeve 52. The ball portion 72 is free of contact with either the bearing sleeve 52 or the lower bearing 54 between the upper contact surface 64 and the cylindrical portion 58 of the bearing sleeve 52, i.e., there is a gap between these two surfaces of contact. This gap allows for a sufficient amount of lubricant to penetrate between the surfaces of contact to reduce wear of the first bearing and the ball portion 72 and thereby improve the operating life of the ball joint assembly 20. The diameter of the ball portion 72 is similar, or at least substantially identical, to the diameter of the curved upper surface of the lower bearing 54.

A second bearing (hereinafter referred to as an "exit bearing 74") is disposed in the exit bearing section 44 of the open interior of the housing 22 and encircles the shank portion 70 of the ball stud 68. The exit bearing 74 has a lower contact surface 76 which is semi-spherically curved and slidingly engages the ball portion 72 of the ball stud 68. Together, the upper contact surface 64 of the lower bearing 54, the cylindrical portion 58 of the bearing sleeve 52 and the lower contact surface 76 of the exit bearing 74 (three surfaces of contact in total) facilitate pivoting movement of the ball stud 68 relative to the housing 22. The exit bearing 74 may be made of, for example, steel or a polymeric material.

The ball portion 72 of the ball stud 68 and the curved upper and lower contact surfaces 64, 76 of the lower and exit bearings 54, 74 respectively and also the cylindrical section 42 of the bearing sleeve 52 all have similar diameters to provide for a very low clearance fit between the ball portion 72 of the bearings. The minimized clearance improves the service life of the ball joint assembly 20 by restricting axial and radial movement of the ball stud 68 relative to the housing 22. Additionally, because of the raised upper contact surface 64 of the lower bearing 54, the contact area between the ball portion 72 and the lower bearing 54 is not only minimized but remains constant even after wear in the bearings 54, 74 and the ball portion 72, thereby improving the rotational torque values of the ball stud 68 over the life of the ball joint assembly 20.

A cover plate 78 is disposed within the cover plate section 46 of the open interior for closing the end of the housing 22 and for trapping the lower bearing 54, bearing sleeve 52, the ball portion 72 of the ball stud 68 and the exit bearing 74 within the open interior of the housing 22. A first spring washer 80 (also known as a Belleville spring) is positioned within the cover plate section 46 of the open interior for biasing the exit bearing 74 in a direction towards the closed end 24 of the housing 22. Specifically, the first spring washer 80 biases the exit bearing 74 against the ball portion 72 of the ball stud 68 to maintain the areas of contact between the ball stud 68 and the upper and lower contact surfaces 64, 76, even in response to wear of the ball portion 72, the lower bearing 54 and the exit bearing 74. As shown in FIG. 1, the cover plate 78 is pre-formed with a frusto-conical shape.

A dust boot 82 is sealed against the housing 22 and the shank portion 70 of the ball stud 68 for sealing the lubricant in the open interior of the housing 22 and for keeping debris out of the ball joint assembly 20. The dust boot 82 includes an elastic cover 84 and a second spring washer 86 which is at least partially encapsulated within the elastic cover 84 for biasing the elastic cover 84 against the cover housing 22 to improve the seal between the dust boot 82 and the housing 22.

As shown in FIG. 4, during assembly of the ball joint assembly 20, a top edge of the housing 22 at the open end 26 is bent radially inwardly to present a flange 88 and to trap the end of the dust boot 82 between the flange 88 and the cover plate 78. During the bending process to create the flange 88 in the housing 22, the frusto-conically shaped cover plate 78 is flattened into the shape shown in the shape shown in FIG. 4.

Figure 5:
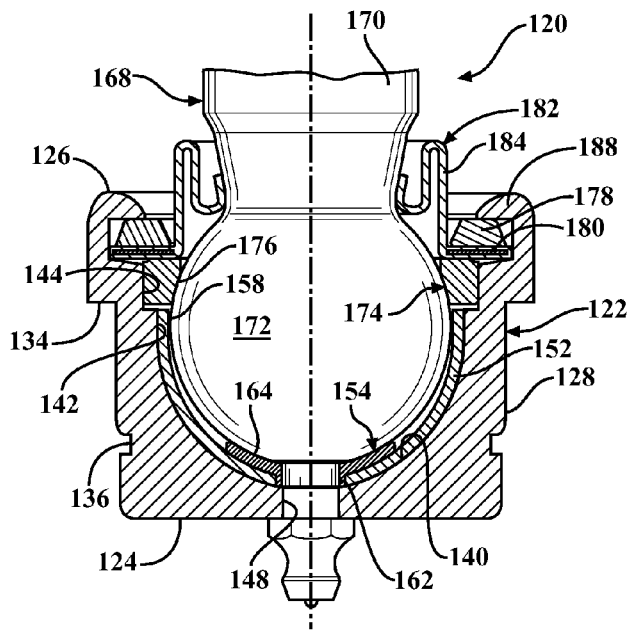
FIG. 5 is a cross-sectional view of a second exemplary embodiment of the ball joint assembly.

A second exemplary embodiment of the ball joint assembly 120 is generally shown in FIG. 5 with like numerals, separated by a factor of 100, indicating corresponding parts with the first exemplary embodiment. The second exemplary embodiment is distinguished from the first exemplary embodiment described above by only including a washer spring 180 embedded within the dust boot 182 and wherein the end of the dust boot 182 with the washer spring is sandwiched between the exit bearing 174 and the cover plate 178 in order to bias the exit bearing 174 against the ball portion 172 of the ball stud 168.

Figure 6:
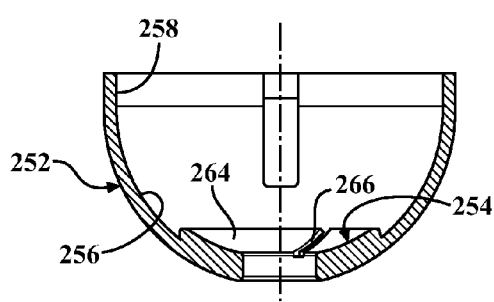
FIG. 6 is a cross-sectional view of an alternate embodiment of the first bearing.

An alternate embodiment of the first bearing is generally shown in FIG. 6 with like numerals, separated by a factor of 200, indicating corresponding parts with the first exemplary embodiment described above. In this embodiment of the first bearing, the bearing sleeve 252 and the lower bearing 254 are formed together as one integral piece.

Referring back to the first exemplary embodiment of FIGS. 1-4, another aspect of the present invention provides for a method of making a ball joint assembly 20. The method includes the step of preparing a housing 22 with an open interior that extends from a closed end 24 to an open end 26. The method includes the step of inserting a first bearing, which includes a bearing sleeve 52 and a lower bearing 54, into the open interior of the house. The lower bearing 54 has a first contact surface (or an upper contact surface 64) which is semi-spherically curved in shape, and the bearing sleeve 52 has a second contact surface which is cylindrical in shape. The method continues with the step of inserting a stud ball into the open interior of the housing 22. The stud ball includes a shank portion 70 and a ball portion 72, and the ball portion 72 is in sliding contact with the upper contact surface 64 of the lower bearing 54 and the second contact surface of the bearing sleeve 52. The method proceeds with the step of inserting a second or exit bearing 74 into the open interior of the housing 22. The exit bearing 74 is formed as a separate piece from the bearing sleeve 52 and lower bearing 54 and has a third or lower contact surface 76 which is in sliding contact with the ball portion 72 of the stud ball. The method continues with the step of biasing the second bearing against the ball portion 72 of the stud ball. The bearing sleeve 52 and lower bearing 54 may be formed as either separate pieces from one another or as a single integral piece. The exemplary method further includes the steps of inserting a cover plate 78 into the open interior to close the open end 26 of the housing 22 and deforming the cover plate 78.

Obviously, many modifications and variations of the present invention are possible in light of the above teachings and may be practiced otherwise than as specifically described while within the scope of the appended claims.

What is claimed is:

1. A ball joint assembly, comprising:
 a housing having an open interior and extending from a first end that is at least substantially closed to a second end that is open;
 a ball stud including a shank portion and a ball portion, said ball portion being at least partially disposed in said open interior of said housing, said shank portion extending out of said second end;
 a first bearing disposed in said open interior of said housing and including:
  a lower bearing including a first contact surface, and
  a bearing sleeve at least partially between said lower bearing and said open interior adjacent said first end, said bearing sleeve including a second contact surface,
  said first and second contact surfaces being in sliding contact with said ball portion of said stud ball and being spaced from one another by a gap, said first contact surface being adjacent said first end and semi-spherically curved with a generally constant diameter, and said second contact surface being between said first end and said second end and generally cylindrical in shape; and
 a second bearing formed as a separate piece from said first bearing and at least partially disposed in said open interior of said housing and including a third contact surface that is in sliding contact with said ball portion adjacent said second end and wherein said second bearing is biased against said ball portion.

2. The ball joint assembly as set forth in claim 1 wherein said bearing sleeve is formed as a separate piece from said lower bearing.

3. The ball joint assembly as set forth in claim 2 wherein said bearing sleeve includes an opening and said lower bearing includes an extension which extends into said opening to interconnect said lower bearing with said bearing sleeve.

4. The ball joint assembly as set forth in claim 1 wherein said bearing sleeve and said lower bearing are formed as one integral piece.

5. The ball joint assembly as set forth in claim 1 wherein said first contact surface is raised above a surface of said bearing sleeve to provide said gap between said first and second contact surfaces.

6. The ball joint assembly as set forth in claim 1 wherein said second bearing is an exit bearing.

7. The ball joint assembly as set forth in claim 6 and further including a spring washer that biases said exit bearing against said ball portion of said ball stud.

8. The ball joint assembly as set forth in claim 6 further including a cover plate closing said open end of said housing.

9. A method of making a ball joint assembly, comprising the steps of:
 preparing a housing with an open interior that extends from a first end that is at least substantially closed to a second end that is open;
 inserting a first bearing into the open interior of the housing, the first bearing having:
  a lower bearing including a first contact surface, and a bearing sleeve at least partially between said lower bearing and said open interior adjacent said first end, said bearing sleeve including a second contact surface, wherein said first and second contact surfaces are spaced from one another by a gap and wherein the first contact surface is adjacent said first end and semi-spherically curved in shape, and wherein said second contact surface is between said first end and said second end and cylindrical in shape;

inserting a ball stud including a shank portion and a ball portion into said open interior of said housing such that said ball portion is in sliding contact with said first and second contact surfaces; and inserting a second bearing in said open interior of said housing, said second bearing being formed as a separate piece from said first bearing and having a third contact surface that is in sliding contact with said ball portion adjacent said second end; and biasing said second bearing against said ball portion of said ball stud.

10. The method as set forth in claim 9 wherein said bearing sleeve and said lower bearing are formed as separate pieces from one another.

11. The method as set forth in claim 9 wherein said bearing sleeve and said lower bearing are formed as one integral piece.

12. The method as set forth in claim 9 further including the step of inserting a cover plate into the open interior of the housing.

13. The method as set forth in claim 12 further including the step of deforming the cover plate after it has been inserted into the open interior.

* * * * *